Figure 1:
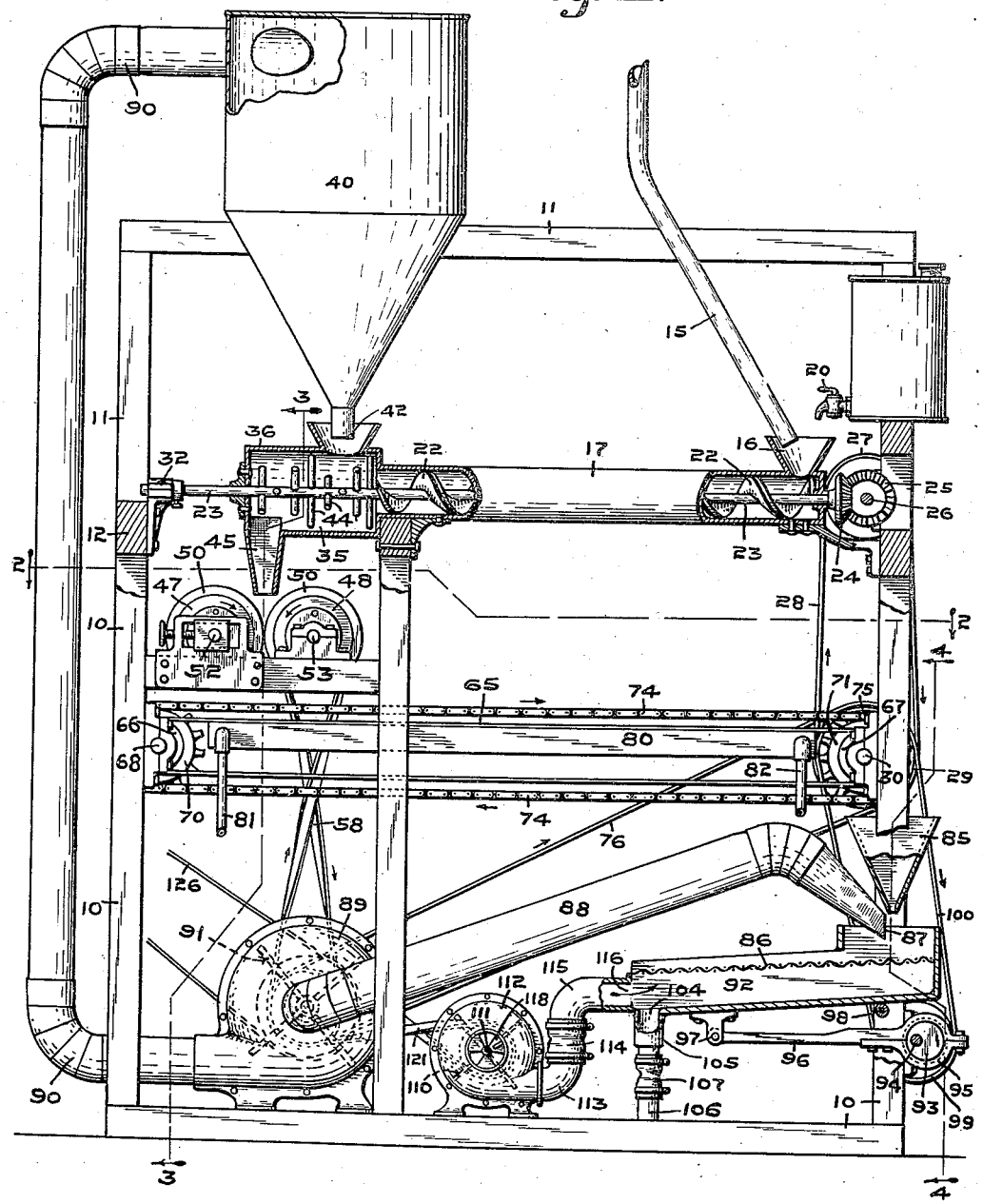

S. HERR.
PROCESS FOR RECLAIMING SEED.
APPLICATION FILED MAR. 9, 1918.

1,283,512.

Patented Nov. 5, 1918.
2 SHEETS—SHEET 1.

INVENTOR.
Shirl Herr,
By Minturn & Woerner
ATTORNEYS.

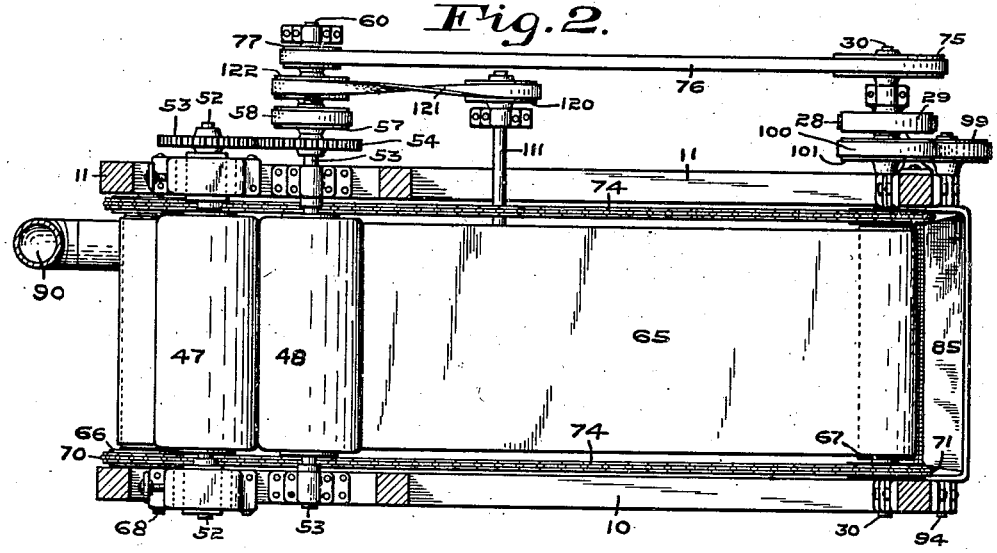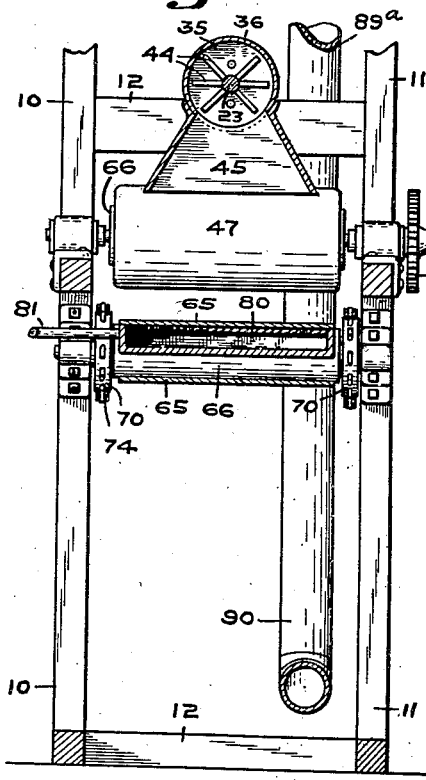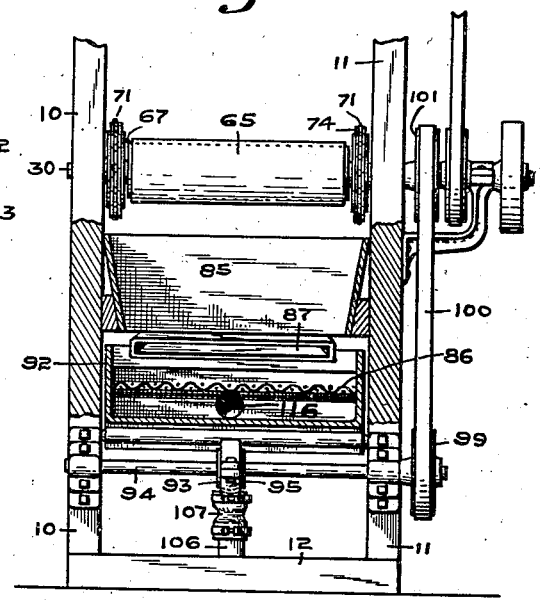

UNITED STATES PATENT OFFICE.

SHIRL HERR, OF CRAWFORDSVILLE, INDIANA, ASSIGNOR TO CRAWFORDSVILLE SEED COMPANY, A COPARTNERSHIP, OF CRAWFORDSVILLE, INDIANA.

PROCESS FOR RECLAIMING SEED.

1,283,512.      Specification of Letters Patent.      Patented Nov. 5, 1918.

Application filed March 9, 1918. Serial No. 221,406.

*To all whom it may concern:*

Be it known that I, SHIRL HERR, a citizen of the United States, residing at Crawfordsville, in the county of Montgomery and State of Indiana, have invented certain new and useful Improvements in Processes for Reclaiming Seed, of which the following is a specification.

This invention relates to that class of machines shown and described in my former Patent No. 813,890, dated February 27, 1906 for removing or separating clover seed from that class of foreign seeds having surfaces when subjected to the action of moisture will produce mucilaginous coatings, except that the present invention is intended to separate clover and alfalfa seeds, possessing non-mucilaginous surfaces, from those species of foreign seeds possessing like surfaces, or perhaps producing mere traces of mucilaginous surfaces, so that a more difficult problem is presented in the process for the removal of the latter seeds.

One of the objects of the present invention consists in removing clover and alfalfa seeds, possessing non-mucilaginous surfaces from foreign seeds, such, for instance, as dodder, wild carrot, mustard, catch-fly, etc., possessing approximately the same non-mucilaginous surfaces, size, shape, specific gravity as that of clover and alfalfa seeds.

A further object of the invention consists in the removal of clover and alfalfa seeds from foreign seeds by moistening the mixed seeds and adding thereto in a dry state a water absorbing comminuted material; subjecting the moistened mixture to compression to cause the protuberances on the ragged surfaces of the comminuted material to become impressed in the surfaces of the foreign seeds which offer less resistance to pressure than clover and alfalfa seeds, and then subjecting the pressed mixture to heat for removing the excess of moisture and bringing about complete separation between the seeds capable of withstanding the penetrating effect of the particles of comminuted material, and, finally, discharging the mixture upon a vibratory screen having perforations of sufficient size to permit free passage of clover and alfalfa seeds which are free of clinging particles of comminuted material and restraining the foreign seeds with clinging particles of comminuted material.

I accomplish the above object of the invention, and such others as may appear from a perusal of the specification and claims, by means of the mechanism illustrated in the accompanying drawings, in which—

Figure 1 is a view partly in side elevation and partly in section of my machine, on the line 1—1 in Fig. 3. Fig. 2 is a horizontal sectional view of the machine, on the line 2—2 in Fig. 1. Fig. 3 is a vertical cross sectional view of a part of the machine, on the line 3—3 in Fig. 1. Fig. 4 is a fragmentary detail view partly in elevation and partly in section, on the line 4—4 in Fig. 1.

Referring to the drawings, the machine comprises two rectangular parallel frame-members 10 and 11 which are secured together by the cross-members 12, the said structure being adapted to support the several moving parts of the machine. The mixed seeds as they come from the threshing machine are fed through a spout or tube 15 entering the top of the frame-work and are discharged into a hopper 16 by which they are fed into a horizontally disposed hollow cylinder 17. As the mixed seeds pass through hopper 16 water is added to said seeds in sufficient quantity to thoroughly moisten their outer surfaces, and for the purpose a source of water is conveniently arranged above hopper 16 and its discharge being controlled by means of a valve 20. As the mixed seeds pass into cylinder 17 they are agitated and conveyed a sufficient distance therein to insure thorough moistening by means of a suitable screw-conveyer 22 having a shaft 23 which is rotated through the intermeshing pinions 24 and 25, the pinion 25 being arranged on a shaft 26 which is provided with a pulley 27 and driven through a belt 28 leading to a pulley 29 on a shaft 30. The end of conveyer-shaft 23 opposite the end carrying pinion 24 is mounted in a journal-box 32 secured to one of the cross-members 12. The seeds after being agitated and conveyed through cylinder 17 are discharged into a chamber 35 in the enlarged portion 36 of said cylinder. Arranged above the enlarged portion 36 is a holder 40 having a conically shaped bottom terminating in a discharge opening 42 which directs the contents of said holder into a hopper 38 communicating with chamber 35. Holder 40 is adapted for storing in a dry state a quantity of comminuted water absorbing material such, for instance, as sawdust, which is fed from holder 40 into the stream of mixed seeds passing through chamber 35. That portion of conveyer-shaft 23 in chamber 35 is provided with a plurality of radially extending arms 44 which, when shaft 23 is rotating, stir and commingle the comminuted material and moistened seeds before the mixture is discharged from chamber 35 through spout 45, the latter directing the discharged mixture between the meeting surfaces of the compression rollers 47 and 48 where a predetermined pressure is exerted thereto. The time required for the seeds to travel the distance between their entry to cylinder 17, at which point the seeds are subjected to moisture, and their discharge upon compression rollers 47 and 48, is sufficient to cause the surfaces of the seeds, other than clover and alfalfa, having a more porous and water absorbing coating, to soften to an appreciable extent with the incident lowering in their power of resisting pressure, so that by taking advantage of the peculiar resulting weakness of the foreign seeds the protuberances on the ragged surfaces of particles of comminuted material are forced through the softened surfaces of the foreign seeds when pressure is applied, causing them to cling together after being discharged from between the compression rollers 47 and 48. Clover and alfalfa seeds having a less porous coating the action of absorption is necessarily delayed, so that their normal power of resisting a given pressure remains unimpaired and thus are capable of resisting the penetrative action of the particles of comminuted material when subjected to the predetermined amount of compression applied by the coacting rollers 47 and 48, and, consequently, they usually are discharged from said rollers free of any clinging particles of foreign material. In case any particles of the comminuted material do cling to some of the clover and alfalfa seeds, on account of temporary cohesive action caused by excess moisture in the mixture, their subsequent disassociation is effected through the removal of the excess moisture by certain means to be hereinafter described and before their final discharge from the machine. To prevent injury to the clover and alfalfa seeds through their contact with the surfaces of rollers 47 and 48 the peripheries of the latter are covered with suitable yieldable material 50, such as rubber and the like. Compression rollers 47 and 48 are arranged on suitable shafts 52 and 53 which are provided with the intermeshing pinions 54 and 55, for insuring uniform movement of rotation of the two rollers, and shaft 53 is further provided with a pulley 57 which is driven by a belt 58 leading to a pulley 59 on a main fan-shaft 60.

When the comminuted material and mixed seeds pass from between compression rollers 47 and 48 they discharge upon a moving apron 65 and are carried thereon to the opposite end of the machine before being discharged therefrom. Apron 65 moves over rollers 66 and 67 one of which is arranged transversely in each end of the machine on shafts 68 and 30, and these are provided with sprocket-wheels 70 and 71 which engage a sprocket-chain 74 for imparting a uniform movement of rotation to the rollers 66 and 67. Shaft 30 is also provided with a pulley 75 which is driven by a belt 76 from a pulley 77 on the main fan-shaft 60.

The upper level of apron 65 and upon which the comminuted material and seeds are deposited passes along and in contact with the upper surface of a drying apparatus comprising a hollow steam-chest 80 having a steam supply pipe 81 and a drain pipe 82 connected therewith. The surface area of steam-chest 80, together with the comparatively slow rate of travel of apron 65, subjects the apron to the action of the heat radiated from chest 80 a sufficient length of time for driving the excess moisture from the mixture and cause the particles of comminuted material clingingly held by capillary attraction to the clover and alfalfa seeds to be disassociated before their discharge from the tail-end of apron 65. The comminuted material and seeds are discharged from apron 65 into a hopper 85 having its discharge end arranged so as to direct the mixture upon a vibratory screen 86. During the downward movement of the falling stream of comminuted material and seeds from the discharge end of hopper 85 and screen 86, said stream of mixture is subjected to the influence of a partial vacuum created at the intake orifice 87 in the adjacently arranged end of tube 88 by means of a fan, whereby the lighter and disassociated particles of the comminuted material are drawn out and removed from the falling stream, leaving behind only the individual clover and alfalfa seeds together with the foreign seeds having particles of the comminuted material clinging to them. As the specific gravity of the individual clover and alfalfa seeds together with the foreign seeds having clinging particles of comminuted material is sufficient to resist and overcome the effect of the vacuum at the orifice 87 of tube 88 they continue undisturbed in their downward travel toward screen 86. Tube 88 communicates with a fan-housing 89 and at the axis of a fan 91 located therein on a fan-shaft 111, so that when fan 91 is rotated a partial vacuum is established at the orifice 87 of tube 88 by the inward flow of air through the latter. The particles of comminuted material drawn into tube 88 pass through fan-housing 89 and are discharged through a tube 90 and are discharged back into holder 40 for further use.

As before stated, the comminuted material and seeds are discharged from apron 65 upon a vibratory screen 86. This screen is arranged in a slight sloping plane with the horizontal so that the material having a diameter greater than the diameter of the perforation in the screen will discharge over the tail-end of the latter. Screen 86 is arranged in a box-like housing 92 which is closed on all sides and bottom with the top open to the atmosphere. Vibratory movement is imparted to screen-housing 92 by means of a circular disk 93 eccentrically mounted on a shaft 94. Passing around disk 93 is a ring 95 which terminates in a rod 96, the latter pivotally connecting with housing 92 at 97, and one end of housing 92 is loosely supported upon a roller bearing 98. Shaft 94 is provided at one end with a pulley 99 and is driven by a belt 100 from a pulley 101 on shaft 30. Screen-housing 92 is provided with a seed-discharge opening 104 leading into a spout 105, the latter communicating with a fixed pipe 106 by means of a flexible connection 107 providing the necessary yieldability between the fixed pipe and housing 92.

Screen 86 performs the function of bringing about the complete separation of the clover and alfalfa seeds from the foreign seeds. This I accomplish by providing screen 86 with perforations of sufficient diameter to permit the passage of individual clover and alfalfa seeds which are free of clinging particles of comminuted material, whereas the particles of comminuted material clinging to the foreign seeds so increase the diameter of the latter as to prevent their passage through the perforations in screen 86. In view of the agitation to which the foreign seeds are subjected while riding upon the surface of screen 86, and to prevent the clinging particles of comminuted material from being disassociated from them, I provide means for partially overcoming the action of gravitation and lessen the effect of the vibratory action of screen 86 against the foreign seeds containing these clinging particles of comminuted material. This I term "air flotation", and is secured by means of a blast-fan 110 which is arranged on a shaft 111 in a fan-housing 112. The blast of air from fan 110 is discharged from fan-housing 112 through an elbow 113 which connects with a flexible coupling 114, the latter communicating with an elbow 115 which discharges through an aperture 116 in the end-wall of screen-housing 92, so that in discharging the blast of air into housing 92 the air passes out through the perforations in screen 86 and serves to partially sustain the weight of the foreign seeds with clinging particles of comminuted material during their passage across the surface of screen 86. As the specific gravity of clover and alfalfa seeds is sufficient to overcome the effect of the pressure of the predetermined blast of air they pass through screen 86 into housing 92 from which they discharge through an opening 104 into the fixed pipe 106. The force and effect of the blast of air discharged from fan 110 into housing 92 can be varied to suit operating conditions by opening and closing damper 118 in fan-housing 112. Fan 110 is driven by providing its shaft 111 with a pulley 120 which is rotated through the medium of a belt 121 leading to a pulley 122 arranged on the main fan shaft 60. Shaft 60 is additionally provided with a pulley 125 which is rotated through the medium of a belt 126 leading to a suitable source of power for the purpose of operating all of the movable parts of the machine.

Having thus fully described my said invention, what I desire to secure by Letters Patent, is—

1. The process of separating desirable from undesirable seeds, which consists in introducing a comminuted material into the mixed seeds, then imparting sufficient pressure to cause the comminuted material to penetrate the lower pressure resisting surfaces of the undesirable seeds, and then removing the free and smaller dimensioned desirable seeds from over dimensioned undesirable seeds having attached particles of comminuted material.

2. The process of separating desirable from undesirable seeds, which consists in moistening the seeds, then introducing into said mixed seeds a comminuted material, then imparting sufficient pressure to cause the comminuted material to penetrate lower pressure resisting surfaces of the undesirable seeds and increase their dimensions, and then removing the free and smaller dimensioned desirable seeds from the over dimensioned seeds.

3. The process of separating desirable from undesirable seeds, which consists in moistening and incident softening of the highly porous water absorbing surfaces of the undesirable seeds, then imparting sufficient pressure to cause the comminuted material to penetrate the surfaces of the softened undesirable seeds, then subjecting the mixed seeds to heat for the removal of excess moisture and disassociate the desirable seeds held by capillary attraction to the comminuted material, and then removing the free ununited desirable seeds from the undesirable seeds having attached particles of comminuted material.

In witness whereof, I have hereunto set my hand and seal at Indianapolis, Indiana, this fifth day of March, A. D. one thousand nine hundred and eighteen.

SHIRL HERR. [L. S.]